Patented Sept. 11, 1934

1,973,069

UNITED STATES PATENT OFFICE 1,973,069

FLUORINATION OF ALIPHATIC COMPOUNDS

Albert L. Henne, Columbus, Ohio, assignor, by mesne assignments, to General Motors Corporation, a corporation of Delaware No Drawing. Application January 30, 1931, Serial No. 512,470

9 Claims. (Cl. 260—162)

This invention relates to the manufacture of fluoro and/or halo-fluoro derivatives of aliphatic hydrocarbons.

The principal objects of this invention are to provide efficient and economical methods of manufacturing halo-fluoro derivatives of hydrocarbons by the use of silicon fluoride as a fluorating agent.

According to this invention a halogen derivative of an aliphatic hydrocarbon is fluorated to produce a fluorine derivative, such as a halofluoro derivative of the hydrocarbon, by interaction with silicon tetrafluoride ($SiF_4$) in the presence of a reaction promoting agency such as a catalyst. A suitable catalyst is $SbCl_5$. $SiF_4$ can be made conveniently and cheaply from low grade fluorspar, sand and sulphuric acid.

As a specific example, when 100 parts of $SiF_4$, 154 parts of $CCl_4$ and 7 parts of $SbCl_5$ are brought together, the first two react, in the presence of the third as a catalyst, to form either or both $CCl_2F_2$ and $CCl_3F$. The silicon tetrafluoride and carbon tetrachloride may be caused to interact by bubbling the fluoride through the chloride in the presence of a catalyst and at room temperature. Reaction rate may be increased by warming the materials. The silicon compounds obtained as by-products may be removed from the products of reaction by washing with water.

The extent of the fluoration may be controlled as by dephlegmation and delivery of the reaction products.

The method may be practiced in the following manner. The halogen derivative, such as $CCl_4$, is placed in a reaction chamber, and the $SiF_4$ is introduced into the $CCl_4$. The gaseous products from the reaction zone are subjected to dephlegmation at a temperature and pressure approximating the vapor pressure characteristics of the desired substance. This dephlegmation returns insufficiently fluorated derivatives to the reaction zone for further fluoration and permits the desired fluorated derivative or derivatives to be collected. The products may be washed with water to remove the silicon derivatives and may be further washed through sodium hydroxide solution for further purification.

A broad commercial advantage in the discovery that silicon fluoride is a fluorating agent is that silicon fluoride and hydrofluoric acid may be used together as fluorating agents without the necessity of purifying or dehydrating the hydrofluoric acid. This is in contrast to fluorating methods in which hydrofluoric acid alone is employed, for in that case it has been found essential to have the acid dehydrated and pure. The presence of the silicon fluoride not only avoids the necessity for the purification but the silicon fluoride itself enters into the reaction and so avoids harming the reaction as by serving as a diluent or causing side reactions. If in the method above described there is placed in the reaction chamber (by weight) 154 parts of carbon tetrachloride and 7 parts of antimony pentachloride and there is introduced into this mixture a mixture of 10 parts silicon fluoride and 36 parts of hydrofluoric acid, the reaction proceeds as in the first example, but there is the added advantage that a large part of the fluorating compound may be hydrofluoric acid as produced and without any special treatment.

A commercial advantage which flows from this use is that low grade fluorspars may be used for the production of the hydrofluoric acid and silicon fluoride to be employed in this process, whereas generally only the high grade fluorspars are employed for the manufacture of hydrofluoric acid.

Apparently the function of the silicon tetrafluoride is to serve as a dehydrating agent for the hydrofluoric acid.

What is claimed is as follows:

1. The process which comprises reacting silicon tetrafluoride and a halogenated aliphatic hydrocarbon containing halogen other than fluorine in the presence of a fluorination catalyst.

2. The process which comprises interacting silicon tetrafluoride and a halogen derivative of methane containing halogen other than fluorine in the presence of a fluorination catalyst, to replace at least a part of the halogen other than fluorine with fluorine.

3. The method which comprises reacting silicon tetrafluoride and a chlorine derivative of methane in the presence of a fluorination catalyst.

4. The process which comprises reacting silicon tetrafluoride and a derivative of ethane containing halogen other than fluorine in the presence of a fluorination catalyst, to replace at least a part of said halogen other than fluorine with fluorine.

5. The process comprising reacting silicon tetrafluoride and a halogenated aliphatic hydrocarbon containing halogen other than fluorine in the presence of a fluorination catalyst, and subjecting the gaseous reaction products to dephlegmation to obtain the desired product.

6. The process which comprises interacting a halogenated aliphatic hydrocarbon containing halogen other than fluorine with a mixture of HF and SiF₄.

7. The process which comprises dehydrating hydrofluoric acid with silicon fluoride and simultaneously fluorating a halogenated hydrocarbon derivative containing halogen other than fluorine with the hydrofluoric acid thus dehydrated, said reaction taking place in the presence of a fluorination catalyst.

8. The method of manufacturing dichlorodifluoromethane which comprises interacting silicon tetrafluoride and carbon tetrachloride in the presence of a fluorination catalyst.

9. The method of manufacturing a dichlorodifluoro methane which comprises interacting silicon tetrafluoride, hydrofluoric acid, and carbon tetrachloride in the presence of a fluorination catalyst.

ALBERT L. HENNE.